United States Patent Office 3,564,049
Patented Feb. 16, 1971

3,564,049
ADAMANTANE-(1)-CARBOXYLIC ACID DERIVATIVES
Wagn Ole Godtfredsen, Vaerlose, Denmark, assignor to Lovens Kemiske Fabrik Produktionsaktieselskab, Ballerup, Denmark, a firm
No Drawing. Original application Sept. 27, 1965, Ser. No. 490,630. Divided and this application Apr. 29, 1969, Ser. No. 820,278
Claims priority, application Great Britain, Sept. 28, 1964, 39,459/64; Feb. 1, 1965, 4,325/65
Int. Cl. C07c *101/14*
U.S. Cl. 260—514     5 Claims

ABSTRACT OF THE DISCLOSURE

This invention relates to functionally reactive derivatives of adamantane-(1)-carboxylic acid having the formula

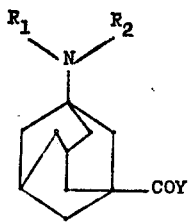

in which each of $R_1$ and $R_2$ is a hydrogen atom or a lower alkyl radical containing from 1–4 carbon atoms, and COY stands for a radical capable of reacting with the amino group of 6-aminopenicillanic acid to result in the formation of 3-substituted adamantyl-(1) penicillins.

---

The present application is a division of the application of Wagn Ole Godtfredsen, Ser. No. 490,630 filed Sept. 27, 1965, now Pat. No. 3,474,089, for New Penicillins.

It has surprisingly been found that the nitrogen atom attached to the 3-position of the 3-substituted adamantane-(1)-carboxylic acids applied in the method according to the invention is capable of being ionized to such an extent that it is possible to perform the reaction between the functionally reactive derivative of such a 3-substituted adamantane-(1)-carboxylic acid and 6-aminopenicillanic acid without a self-condensation taking place which would result in the formation of polymeric adamantane derivatives. It has furthermore been found that, possibly due to stearic hindrance in the adamantane molecule, suitable reactive functional derivatives of the 3-substituted adamantane-(1)-carboxylic acid are obtainable without previous protection of the primary or secondary amino group attached to the 3-position of the adamantane molecule, since any products resulting from side reactions during the formation of the functionally reactive derivative of the 3-substituted adamantane-(1)-carboxylic acid are formed only in small quantities without importance for obtaining a satisfactory yield and purity of the desired 3-substituted adamantyl-(1)-penicillin by reaction between the functionally reactive derivative of the 3-substituted adamantyl-(1)-carboxylic acid and 6-amino-penicillanic acid.

Therefore, it is not necessary to protect the amino group in the 3-position of the adamantane molecule while carrying out the process resulting in the production of the present penicillins. For example, 3-amino-adamantyl-(1)-penicillin has proved obtainable in good yields, simply by reacting 3-amino-adamantane-(1)-carboxylic acid with, e.g. thionyl chloride, and subsequently reacting the resulting product with 6-amino-penicillanic acid in an aqueous medium and at a suitable pH-value at which the amino group of the 6-amino-penicillanic acid is substantially non-ionized, e.g. at a pH-value of about 5.5–7.0.

Since the standard procedure for production of penicillins of the general formula

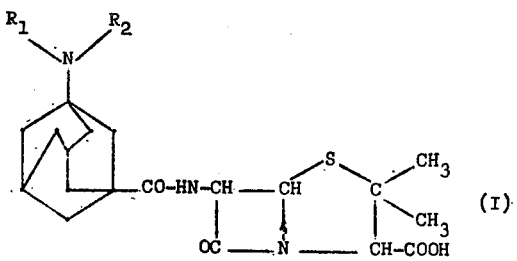

in which $R_1$ and/or $R_2$ are hydrogen would imply that the amino group attached to the adamantane molecule has to be protected during the reaction, e.g. by a carbobenzoxylation, the above feature gives a purely preparative advantage making the final reductive cleavage of the carbobenzoxy group necessary for the obtaining of the desired penicillin of Formula I superfluous.

Suitable functional derivatives of the 3-substituted adamantane-(1)-carboxylic acid include the halides, such as the carboxylic acid chloride, the carboxylic acid anhydrides, mixed anhydrides, such as the mixed anhydride with a monoester of carbonic acid, or of a sulphonic acid, and the imidazolides of the said carboxylic acids.

The method of the invention may be performed in accordance with known procedures, due regard however always having to be taken to the relative instability of the penicillin obtained.

For instance, it is desirable to perform the reaction between the functional derivative of the substituted adamantane-(1)-carboxylic acid and the 6-amino-penicillanic acid at a temperature of about 0° C., and preferably at a pH-value in the neighbourhood of the neutral point, e.g. in the presence of a suitable buffer. Under such conditions, the reaction will generally be completed in from 15 minutes to a few hours.

The resulting penicillin may in certain cases be isolated by methods commonly used for the isolation of amphoteric compounds. Thus, the pH-value of an aqueous solution of the compound may be adjusted to the isoelectric point of the compound in question, and the precipitated product, if any, may be collected and further purified by crystallization.

Sparingly soluble salts of the penicillins may, by way of example, also be isolated by a double decomposition performed in water, or in mixtures of water and a suitable organic solvent, in a known manner.

From its sparingly soluble amine salts, the penicillin may be appropriately transformed into e.g. its sodium salt by reaction with aqueous sodium bicarbonate in the presence of a water-immiscible solvent, whereby the amine is removed. A crude sodium salt may then be isolated by freeze-drying of the aqueous phase and may be subjected to additional purification.

The starting materials of Formula II which are used in the embodiment aforesaid are hitherto unknown substances which may be produced from the readily accessible 3-bromo-adamantane-(1)-carboxylic acid which is described in Chemische Berichte 95, 669 (1962) Stetter & Mayer. By treatment of this acid with acetonitrile in sulphuric acid there is obtained the hitherto unknown 3-acetamino-adamantane-(1)-carboxylic acid which, by saponification, is converted into the corresponding free amine and, if desired, the 3-amino-adamantane-(1)-carboxylic acid may be mono- or dialkylated to produce 3-mono- or 3-dialkylamino-adamantane - (1) - carboxylic acids.

In another appropriate embodiment of the invention, the compound 3-amino-adamantyl-(1)-penicillin is prepared by reacting the hitherto unknown 3-azido-adamantane-(1)-carboxylic acid, in the form of one of its functionally reactive derivatives, such as the halide, with 6-amino-penicillanic acid, and subsequently hydrogenating the resulting 3-azido-adamantyl-(1)-penicillin to form the desired 3-amino-adamantyl-(1)-penicillin.

It has been found particularly appropriate in this latter method to perform the hydrogenation at a fixed pH-value in the neighbourhood of the neutral point which is accomplished by successively neutralizing the highly basic amino group formed during the hydrogenation, for example by automatic addition of acid.

In this embodiment the 3-amino-adamantyl-(1)-penicillin is formed in extremely good yields and purity because side reactions are avoided, and because the hydrogenation may be optimalized owing to the control of the process by means of the acid consumed in connection with the above neutralization.

The 3-azido-adamantane-(1)-carboxylic acid used as the starting material in this latter embodiment is also obtainable from 3-bromo-adamantane-(1)-carboxylic acid, by the latter compound being reacted with lithium azide in an inert anhydrous solvent e.g. dimethylformamide.

3-amino-adamantyl-(1)-penicillin prepared as stated above has a melting point of 235° C. (dec.) and $[\alpha]_D^{20}+253°$ (in water). Its solubility in water as an ampho-ion amounts to approximately 4.5% (by weight). An elementary analysis of a product, the water content of which amounted to 4.8% (by weight) as determined by the Karl Fischer method, gave the following result:

Calc'd for $C_{19}H_{27}N_3O_4S$, $H_2O$ (percent): C, 55.46; H, 7.10; N, 10.21. Found (percent): C, 55.65; H, 7.15; N, 10.10.

The present invention furthermore comprises therapeutic compositions applicable in the treatment of infectious diseases. These compositions of the invention contain as a therapeutical component at least one member of the class consisting of penicillins of the general Formula I and their salts with atoxic pharmaceutically acceptable inorganic bases, mixed with solid or liquid pharmaceutical carriers and auxiliary substances.

In the said composition the therapeutically active material may constitute from 1 to 95 percent by weight of the composition.

The composition in question can either be worked up to pharmaceutical forms of presentation such as tablets, pills, dragées, or suppositories, or the composition can be filled into medical containers such as capsules or ampoules, or as far as mixtures or ointments are concerned may be filled into bottles or tubes or similar containers.

Pharmaceutically acceptable organic or inorganic, solid or liquid carriers suitable for enteral, parenteral, or local administration can be used to make up such compositions. Water, gelatine, lactose, starches, magnesium stearate, talc, vegetable and animal oils and fats, benzyl alcohols, gums, polyalkylene glycols, petroleum jelly, cocoa butter, lanolin, or other known carriers for medicaments are all of them suitable as carriers, while stabilizing agents, wetting or emulsifying agents, salts for varying the osmotic pressure, or buffers for securing an adequate pH-value of the composition can be used as auxiliary components.

Another object of the invention resides in the selection of a suitable dose of the penicillins and penicillin salts of the invention, which can be administered so that the desired effect is achieved without side-effects.

It has been found that the penicillins or penicillin salts of the invention are conveniently administered in dosage units containing not less than 100 mg., and preferably from 250 mg. to 2000 mg. of the penicillin in question, calculated as the free acid.

By the term dosage unit is meant a unitary, i.e. a single dose, which is capable of being administered to the patients, and which can be readily handled and packed, remaining a physically stable unit dose comprising either the active material alone, or a mixture of the active material and solid or liquid pharmaceutical diluents or carriers.

If the composition is to be injected, a sealed ampoule, a vial, or similar container may be provided containing a parenterally acceptable solution or dispersion of the active material as the dosage unit aforesaid.

For enteral administration the dosage unit may preferably consist of from 250 mg. to 500 mg. of the penicillin in question, for instance in the form of tablets which advantageously should be enteric-coated.

In an appropriate embodiment, however, the penicillins of the invention are administered in the form of injectable preparations, such as an aqueous or oily dispersion of the penicillin, which preparations may contain the penicillin in question in the form of the ampho-ion or one of its non-toxic salts, or mixtures of these compounds, e.g. in order to obtain a high initial effect and a desired prolonged effect. For this purpose the preparation can advantageously contain both a water-soluble salt of the penicillin and one of its water-insoluble salts.

Among suitable salts of the penicillins of the invention mentioned may be made of the alkali metal salts, the alkaline earth metal salts, the ammonium salt, and salts of non-toxic amines, such as trialkylamines, e.g. triethylamine, procaine, dibenzylamine, N,N'-dibenzylethylenediamine, and other amines used to form salts with known penicillins.

For parenteral administration the dosage unit according to the present invention may contain from 250 mg. to 2000 mg., and preferably 1000 mg., per dose, calculated as the free acid.

In the form of the dosage units aforesaid the penicillins can be administered once or several times a day at appropriate intervals, always depending, however, on the condition of the patient.

In clinical practice the ampho-ion of 3 - amino-adamantyl - (1) - penicillin has successfully been used, for instance in the treatment of osteomyelitis.

In the latter treatments an aqueous dispersion of the ampho-ion of the said penicillin was used administered intramuscularly in doses of 1000 mg. per injection.

In connection with the treatments it was established that the blood penicillin concentration 2 hours after the injection averaged 16 mcg./ml., 4 hours after the injection 11 mcg./ml., and 12 hours after the injection, 1.5 mcg./ml.

A suitably high and constant penicillin concentration was obtained with 3 daily injections which were given during the period of treatment which ranged from a few weeks, to several months in severe cases, until recovery was established by clinical as well as by bacteriological examination.

The products of the invention, and suitable methods of producing them, are further illustrated by the following non-limiting examples.

EXAMPLE 1

(a) 3-acetamino-adamantane-(1)-carboxylic acid

A mixture of 3-bromo-adamantane-(1)-carboxylic acid (5.8 g.), acetonitrile (45 ml.) and concentrated sulphuric acid (9 ml.) was refluxed for 20 hours.

After cooling, the mixture was poured into water (250 ml.), and the resulting suspension concentrated in vacuo to remove most of the acetonitrile.

Aqueous sodium hydroxide (33%) was added until the pH was 4.0 (about 24 ml.).

The precipitate was filtered off, washed with water, and dried to yield 4.4 g. of the desired product, M.P. 230–240° C. Two recrystallizations from methanol-acetonitrile raised the M.P. to 254–258° C.

(b) 3-amino-adamantane-(1)-carboxylic acid

A solution of 3-acetamino-adamantane-(1)-carboxylic acid (3.0 g.) in 4 N sodium hydroxide (40 ml.) was refluxed for 5 hours. After cooling, the pH of the solution was adjusted to 7 with acetic acid. The crystalline precipitate was filtered off, washed with ethanol and dried to yield 2.20 g. of the desired compound, M.P. over 330° C. In order to purify the compound, 2.0 g. of it was suspended in water (10 ml.), 4 N NaOH (2 ml.) was added, and the resulting solution filtered through a filter aid known under the registered trademark "Dicalite." The filtrate was adjusted to a pH of 6.5 with acetic acid. The resulting crystalline precipitate was filtered off, washed with a little water followed by alcohol, and dried to yield 1.55 g. of pure 3-amino-adamantane-(1)-carboxylic acid.

*Analysis.*—Calc'd for $C_{11}H_{17}NO_2$ (percent): C, 67.66; H, 8.78; N, 7.17. Found (percent): C, 67.49; H, 8.93; N, 7.24.

EXAMPLE 2

3-amino-adamantyl-(1)-penicillin 3-amino-adamantane-(1)-carboxylic acid (1 g.) was refluxed with thionyl chloride (4.6 ml.) for 1 hour. Excess of thionyl chloride was removed in vacuo. The residue was dissolved in benzene (3 ml.), and the resulting solution evaporated under reduced pressure to remove traces of thionyl chloride. This process was repeated to leave 1.3 g. of a solid, almost colourless residue. The elementary analysis and the infra-red spectrum suggest that this product is 3-thionylimino-adamantane-(1)-carboxylic acid chloride. 500 mg. of this product were dissolved in dry acetone (8 ml.), and the resulting solution was added during 20 minutes with stirring, to a suspension of 6-amino-penicillanic acid (520 mg.) in 50% aqueous acetone (20 ml.), previously adjusted to a pH of 7.0 with triethylamine. During the process, a pH-value of 7.0 was maintained by the addition of a 1 N solution of triethylamine in 50% aqueous acetone from an automatic titrator. At the end of the reaction, which took place at room temperature, a clear solution was obtained. Acetone was removed in vacuo, and the resulting aqueous solution was tested for antibacterial activity by the agar-cup method, using *Sarcina lutea* as test organism, and a pure sample of 3 - amino-adamantyl-(1)-penicillin as reference compound. According to this test 70% of the theoretical amount of 3-amino-adamantyl-(1)-penicillin was formed. Paper chromatography revealed that only one antimicrobial compound was present, and that this was identical with authentic 3-amino-adamantyl-(1)-penicillin.

The aqueous solution was concentrated in vacuo to a volume of 4 ml. Addition of acetone (40 ml.) gave an oily precipitate which after decanting and addition of fresh acetone gave 900 mg. of a semicrystalline solid which contained 50% of the theoretical amount of 3-amino-adamantyl-(1)-penicillin.

EXAMPLE 3

3-amino-adamantyl-(1)-penicillin 3-amino-adamantane-(1)-carboxylic acid (1.0 g.) was refluxed with thionyl chloride (4.6 ml.) for 1 hour. After cooling, excess of thionyl chloride was removed in vacuo. The residue was dissolved in dry benzene (3 ml.) and the solution was evaporated in vacuo to remove traces of thionyl chloride. The residue (1.3 g.) was dissolved in dry benzene (20 ml), and dry hydrogen chloride was bubbled through the solution for 15 minute to give a deposit of crystalline colourless material. The mixture was evaporated under reduced pressure to leave 1.3 g. of 3-amino-adamantane-(1)-carboxylic acid chloride, hydrochloride. This material was added in small portions at room temperature to a stirred suspension of 6-amino-penicillanic acid (520 mg.) in water (10 ml.) previously adjusted to a pH of 5.5 with 1 N aqueous NaOH. During this step, a pH of 5.5 was maintained by the addition of 1 N aqueous NaOH, the addition being controlled by an automatic titrator.

The resulting solution was tested for antibacterial activity by the agar-cup method using *Sarcina lutea* as test organism. According to this test about 30% of the theoretical amount of 3-amino-adamantyl-(1)-penicillin had been formed. Paper chromatography revealed that only one antibacterial compound was present in the solution, and that this was identical with authentic 3-amino-adamantyl-(1)-penicillin.

EXAMPLE 4

3-amino-adamantyl-(1)-penicillin (a) A solution of 3-amino-adamantane-(1)-carboxylic acid (195 mg.) in 2 N sodium hydroxide (1 ml.) was cooled in ice-water, and carbobenzoxy chloride (0.18 ml.) was added. The mixture was shaken thoroughly for 10 minutes. After acidification with hydrochloric acid, the mixture was extracted with ether. The etheral phase was washed with water, dried, and avaporated to dryness to yield 200 mg. of 3-carbobenzoxy-amino-adamantane-(1)-carboxylic acid, M.P. 112–114° C. The analytical sample, which was obtained after recrystallization from ether-hexene, had a M.P. of 115–115.5° C.

*Analysis.*—Calc'd for $C_{19}H_{23}NO_4$ (percent): C, 69.28; H, 7.04; N, 4.25. Found (percent): C, 69.49; H, 7.08; N, 4.19.

(b) 3 - carbobenzoxyamino-adamantane-(1)-carboxylic acid (500 mg.) was refluxed with thionyl chloride (4 ml.) for 90 minutes. Excess thionyl chloride was removed in vacuo and the residue, which consisted of crude 3-carbobenzoxyamino-adamantane-(1)-carboxylic acid chloride, was dissolved in acetone (7 ml.). The resulting solution was added at 0° C. to a solution of 6-amino-penicillanic acid (330 mg.) in 3% sodium bicarbonate solution (10 ml.), with stirring.

After stirring for 30 minutes, the mixture was extracted with ether. The aqueous phase was separated, adjusted to a pH of 2.5 with dilute sulphuric acid, and thereafter immediately extracted with ether. The ether extract was washed with water and dried, whereafter benzyl-β-phenylethylamine (0.2 ml.) was added to precipitate the crystalline benzyl-β-phenylethylamino salt of the 3-carbobenzoxyamino-adamantyl-(1)-penicillin which was collected, washed with ether, and dried to yield an 89% pure product.

(c) 650 mg. of the above benzyl-phenylethylamine salt of 3-carbobenzoxyamino-adamantyl - (1) - penicillin were suspended in 3% aqueous sodium bicarbonate (15 ml.). Ethyl acetate (15 ml.) was added, and the mixture was stirred until two clear phases were obtained. The aqueous phase was separated and added to a prehydrogenated suspension of 5% palladium on calcium carbonate (5 g.) in water (15 ml.), whereafter the mixture was shaken under a pressure of one atmosphere of hydrogen. When the consumption of hydrogen ceased (after 30 minutes), the catalyst was filtered off and washed with water. The combined filtrate and washings were adjusted to pH of 6 with dilute sulphuric acid, and freeze-dried to yield 400 mg. of the 3-amino-adamantyl-(1)-penicillin.

EXAMPLE 5

3-amino-adamantyl-(1)-penicillin (a) A mixture of 3-bromo-adamantane-(1)-carboxylic acid (5.0 g.) and lithium azide (10 g.) in dimethylformamide (40 ml.) was refluxed for 18 hours. After cooling the solution was concentrated in vacuo, and the residue was dissolved in water. The solution (40 ml.) was acidified with hydrochloric acid, and extracted with ether (2× 25 ml.). The combined extracts were washed with water, dried, and evaporated to yield 2.5 g. of a product which, in addition to 3-azido-adamantyl-(1)-carboxylic acid, contained some 3-hydroxy-adamantane-(1)-carboxylic acid. The latter compound is insoluble in carbon tetrachloride, and was removed by treatment with this solvent. The filtrate, which contained the 3-azido-adamantyl-(1)-carboxylic acid, was evaporated to dryness, and the residue chromatographed over a column of 50 g. of silica gel. Elution with pentane ether (85:15) gave 1.3 g. of pure 3-azido-adamantyl-(1)-carboxylic acid, M.P. 101–102° C.

The infra-red spectrum (KBr) contained a strong band at 2110 cm.$^{-1}$.

(b) 3-azido-adamantyl-(1)-carboxylic acid (1.55 g.) was refluxed with thionyl chloride (3 ml.) for 1 hour. Excess thionyl chloride was removed in vacuo, and the residue, which consisted of crude 3-azido-adamantyl-(1)-carboxylic acid chloride, was dissolved in acetone (25 ml.). The resulting solution was added during 15 minutes at 5° C. to a solution of 6-amino-penicillanic acid (1.53 g.) in 3% sodium bicarbonate solution (30 ml.) with stirring. After stirring for 1 shour at 5° C., the mixture was washed twice with 25 ml. of ether. The aqueous phase was covered with a layer of 50 ml. of ether, and was adjusted to a pH of 2.1 with dilute sulphuric acid, the free penicillin passing into the organic phase. The layers were separated, and the aqueous phase was extracted twice again with 5 ml. portions of ether.

Water (10 ml.) was added to the combined ether extracts, and thereafter concentrated aqueous potassium bicarbonate was added with stirring until the pH of the aqueous phase was 7.0. The aqueous phase was separated, n-butanol (50 ml.) was added, and the mixture was distilled in vacuo to remove the water. Further amounts of n-butanol were added and the distillation continued until all of the water was removed. During this process, the potassium salt of 3-azido-adamantyl-(1)-penicillin crystallized. It was filtered off, washed with acetone, and dried to yield 2.1 g. of a 95% pure product.

(c) A solution of the potassium salt of 3-azido-adamantyl-(1)-penicillin (400 mg.) in water (10 ml.) was added to a prehydrogenated suspension of 5% palladium on calcium carbonate (800 mg.) in 5 ml. of water. The mixture was shaken under a pressure of one atmosphere of hydrogen for 1 hour. The catalyst was filtered off and washed with water (2× 10 ml.). The combined filtrate and washings were adjusted to a pH of 6 with dilute hydrochloric acid and freeze-dried to yield 330 mg. of the 3-amino-adamantyl-(1)-penicillin with a purity of 72%.

The infra-red spectrum showed that the strong azido-band at 2110 cm.$^{-1}$ in the spectrum of the starting material had disappeared, while the band at 1775 cm.$^{-1}$ due to the β-lactam ring was still present.

A paper chromatogram (solvent: water-saturated ethyl acetate "Whatman" No. 1 paper buffered with 10% sodium citrate at pH 5.6) was placed on an agar plate seeded with *Staphylococcus aureus*. After incubation at 37° C. a single well-defined zone of inhibition near the starting place was observed, while no other zones of inhibition could be detected. ("Whatman" is a registered trademark).

EXAMPLE 6

3-amino-adamantyl-(1)-penicillin

A prehydrogenated suspension of 10 percent palladium on calcium carbonate (12 g.) in water (250 ml.) was adjusted to a pH-value of 8.5. A solution of 22.8 g. (50 mmol) of the potassium salt of 3-azido-adamantyl-(1)-penicillin in 100 ml. of water was added slowly with stirring while hydrogen was bubbled through the suspension. During the process, a pH-value of 8.5 was maintained by addition of 2 N acetic acid, the addition being controlled by an automatic titrator. When the hydrogenation was completed (i.e. when the consumption of acid ceased) the catalyst was removed by filtration and washed on the filter with three 25 ml. portions of water whereafter the combined filtrates and washings were adjusted to a pH of 6.5 with acetic acid. n-Butanol (750 ml.) was added, and the resulting mixture was concentrated in vacuo whereby the water was removed azeotropically. To the residual butanolic solution, water (3 ml.) was added and crystallization induced by scratching or seeding. After standing overnight in a refrigerator the crystals, consisting of a hydrated form of the desired product, were collected, washed with n-butanol followed by acetone, and dried. The product thus obtained was recrystallized as follows: To a solution of 10 g. in water (100 ml.), acetone (600 ml.) was added slowly with stirring. After standing, the crystals were filtered off, washed with acetone, and dried to yield 8.0 g. of the desired penicillin in the form of its monohydrate. M.P. 235° C. (dec.) and $[\alpha]_D^{20}$+253° (in water).

*Analysis.*—Calc'd for $C_{19}H_{27}N_3O_4S,H_2O$ (percent): C, 55.46; H, 7.10; N, 10.21. Found (percent): C, 55.67; H, 7.15; N, 10.10.

The content of water was determined by the Karl Fischer method to 4.8%. The pure penicillin has a solubility in water of about 4.5% in the form of the ampho-ion.

EXAMPLE 7

3-dimethylamino-adamantyl-(1)-penicillin (a) (3-dimethylamino-adamantane-(1)-carboxylic acid).—To a solution of 3-amino-adamantane-(1)-carboxylic acid (10 g.) in 0.5 M aqueous potassium hydroxide (100 ml.) was added 35% aqueous formaldehyde (8 ml.), and, after standing for 15 minutes, 10% palladium on calcium carbonate catalyst (6 g.).

The mixture was shaken under one atmosphere of hydrogen at about 50° C. During 24 hours 2.3 l. of hydrogen was consumed, and the consumption ceased.

After removal of the catalyst by filtration the filtrate was adjusted to pH 7.0 with dilute hydrochloric acid and evaporated to dryness. The residue was treated with 250 ml. of hot ethanol, insoluble material (KCl) was filtered off, and the filtrate was evaporated in vacuo. The crystalline residue (12 g.) was recrystallized from ethanol to yield 8.8 g. of the desired compound.

*Analysis.*—Calc'd for $C_{13}H_{21}NO_2,\frac{1}{2}H_2O$ (percent): C, 67.31; H, 9.54; N, 6.04. Found (percent): C, 67.70; H, 9.46; N, 5.98.

(b) (3-dimethylamino-adamantyl-(1)-penicillin.— 3-dimethylamino-adamantane-(1)-carboxylic acid (1.6 g.) was refluxed with thionyl chloride (3 ml.) for 1 hour. Excess thionyl chloride was removed in vacuo, and the residue, consisting of crude 3-dimethylamino-adamantane-(1)-carboxylic acid chloride hydrochloride, was suspended in dry acetone (30 ml.), and the suspension added during 20 minutes with stirring to a solution of 6-amino-penicillanic acid (1.53 g.) in 3% aqueous potassium bicarbonate solution (50 ml.). After stirring for 1 hour at 0–5° C. the mixture was washed twice with 50 ml. of ether. The aqueous phase was adjusted to a pH-value of 6.5 with 2-ethyl-hexanoic acid and concentrated in vacuo to a volume of 20 ml.

Addition of acetone (80 ml.) yielded the desired penicillin as a white amorphous powder with a purity of 85%.

By substituting 3-methyl-ethylamino-adamantane-(1)-carboxylic acid, and 3-dientylamino-adamantane-(1)-carboxylic acid, respectively, for 3-dimethylamino-adamantane-(1)-carboxylic acid in the above procedure, 3-methyl-ethylamino-adamantyl-(1)-penicillin and 3-diethyl-amino-adamantyl-(1)-penicillin, respectively, are obtained.

EXAMPLE 8

3-amino-adamantyl-(1)-penicillin triethylamine salt

To a suspension of 3-amino-adamantyl-(1)-penicillin (410 mg.) in water (3 ml.), triethylamino (0.15 ml.) was added. Addition of acetone (15 ml.) to the resulting clear solution cause the desired compound to crystallize as colourless crystals, which were collected, washed with acetone, and dried in vacuo.

In the same manner the salts with trimethylamine, methyldiethylamino, triethanolamine, and ethylpiperidine were prepared.

EXAMPLE 9

3-amino-admantyl-(1)-penicillin sodium salt

To a suspension of 3 - amino - adamantyl - (1) - penicillin (410 mg.) in water (3 ml) 1 N aqueous sodium hydroxide (1.0 ml.) was added dropwise with stirring. Addition of acetone (30 ml.) precipitated the desired sodium salt as an amorphous powder, which was filtered off, washed with acetone, and dried in vacuo at room temperature.

In a similar manner the lithium potassium and calcium salts were prepared.

I claim:

1. A compound having the formula

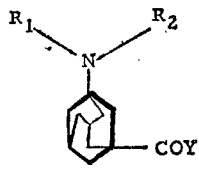

in which each of $R_1$ and $R_2$ is a hydrogen atom or a lower alkyl radical containing from 1–4 carbon atoms and Y is a hydroxy group or a halogen atom.

2. A 3 - monoalkylamino or a 3,3' - dialkylamino - adamantane - (1) - carboxylic acid.

3. 3,3' - dimethylamino - adamantane - (1) - carboxylic acid.

4. 3 - acetamino - adamantane - (1) - carboxylic acid.

5. 3 - thionylimino - andamantane - (1) - carboxylic acid halide.

References Cited

UNITED STATES PATENTS 3,397,233    8/1968    Cairns _____ 260—563

OTHER REFERENCES

Stepanov et al., C.A., volume 65, 627 (1966).

LORRAINE A. WEINBERGER, Primary Examiner

R. GERSTL, Assistant Examiner

U.S. Cl. X.R.

260—309.7, 463, 468. 544, 545, 546